(12) United States Patent
Hino et al.

(10) Patent No.: US 10,968,315 B2
(45) Date of Patent: Apr. 6, 2021

(54) METHOD OF PRODUCING A POLYMER NANOFIBER SHEET

(71) Applicant: CANON KABUSHIKI KAISHA, Tokyo (JP)

(72) Inventors: Tetsuo Hino, Yamato (JP); Kazuhiro Yamauchi, Suntou-gun (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/709,098

(22) Filed: Dec. 10, 2019

(65) Prior Publication Data

US 2020/0109241 A1     Apr. 9, 2020

Related U.S. Application Data

(62) Division of application No. 14/603,782, filed on Jan. 23, 2015, now abandoned.

(30) Foreign Application Priority Data

Jan. 31, 2014  (JP) ................. 2014-016616

(51) Int. Cl.
*C08G 59/22* (2006.01)
*C08G 63/08* (2006.01)
(Continued)

(52) U.S. Cl.
CPC ......... *C08G 73/14* (2013.01); *C08G 59/4276* (2013.01); *C08L 79/08* (2013.01);
(Continued)

(58) Field of Classification Search
CPC .. C08G 59/1438; C08G 59/22; C08G 59/226; C08G 63/08; C08G 63/91; C08G 63/912;
(Continued)

(56) References Cited

U.S. PATENT DOCUMENTS 4,312,902 A    1/1982  Murase et al.
4,530,975 A    7/1985  Mukoyama et al.
(Continued)

FOREIGN PATENT DOCUMENTS

JP    8-218223 A      8/1996
JP    2006-169277 A   6/2006
(Continued)

OTHER PUBLICATIONS

Notification of Reasons for Refusal in Japanese Application No. 2014-016616 (dated Nov. 28, 2017).

*Primary Examiner* — Leo B Tentoni
(74) *Attorney, Agent, or Firm* — Venable LLP

(57) ABSTRACT

Provided is a polymer nanofiber sheet having high delamination resistance, a high mechanical strength, and a high specific surface area. Specifically, provided is a polymer nanofiber sheet, including polymer nanofibers, the polymer nanofibers being laminated and three-dimensionally entangled with each other, in which: at least part of the polymer nanofibers are crosslinked at a crosslinked part having crosslinking portions and a non-crosslinking portion; and the crosslinked part contains a low-molecular weight epoxy compound having a molecular weight of from 100 to 3,000.

4 Claims, 2 Drawing Sheets

(51) Int. Cl.

| | |
|---|---|
| *C08G 63/91* | (2006.01) |
| *C08J 3/03* | (2006.01) |
| *C08J 3/09* | (2006.01) |
| *C08J 3/24* | (2006.01) |
| *C08L 63/00* | (2006.01) |
| *C08L 67/04* | (2006.01) |
| *D01D 10/02* | (2006.01) |
| *D01F 6/44* | (2006.01) |
| *D01F 6/88* | (2006.01) |
| *D01F 6/90* | (2006.01) |
| *D01F 6/92* | (2006.01) |
| *D01F 6/94* | (2006.01) |
| *D01F 11/04* | (2006.01) |
| *D02J 13/00* | (2006.01) |
| *C08G 73/14* | (2006.01) |
| *C08L 79/08* | (2006.01) |
| *D04H 1/728* | (2012.01) |
| *D04H 1/4342* | (2012.01) |
| *C08G 59/42* | (2006.01) |
| *D01D 5/00* | (2006.01) |
| *C08G 59/14* | (2006.01) |

(52) U.S. Cl.
 CPC ......... *D01D 5/0038* (2013.01); *D04H 1/4342* (2013.01); *D04H 1/728* (2013.01); *C08G 59/1438* (2013.01); *C08G 59/226* (2013.01); *C08G 63/912* (2013.01); *C08J 3/245* (2013.01); *C08J 2325/06* (2013.01); *C08J 2363/00* (2013.01); *C08J 2367/04* (2013.01); *C08J 2379/08* (2013.01)

(58) Field of Classification Search
 CPC ..... C08G 73/14; C08J 3/03; C08J 3/09; C08J 3/24; C08J 3/245; C08L 63/00; C08L 67/04; C08L 79/08; D01D 5/003; D01D 5/0038; D01D 5/0046; D01D 10/02; D01F 6/44; D01F 6/88; D01F 6/90; D01F 6/92; D01F 6/94; D01F 11/04; D02J 13/00

USPC ......... 264/236, 331.11, 331.19, 331.21, 464, 264/465, 466, 484; 525/113, 122, 328.2, 525/333.3, 423, 450, 524

See application file for complete search history.

(56) References Cited

U.S. PATENT DOCUMENTS

| | | | |
|---|---|---|---|
| 5,100,435 | A | 3/1992 | Onwumere |
| 5,681,656 | A | 10/1997 | Inukai et al. |
| 6,063,839 | A | 5/2000 | Oosedo et al. |
| 6,265,333 | B1 * | 7/2001 | Dzenis ............ B32B 5/28 442/346 |
| 8,236,906 | B2 | 8/2012 | Ejiri et al. |
| 9,522,352 | B2 | 12/2016 | Takashima et al. |
| 9,580,847 | B2 | 2/2017 | Takashima et al. |
| 9,943,793 | B2 | 4/2018 | Takashima et al. |
| 10,239,006 | B2 | 3/2019 | Takashima et al. |
| 10,294,595 | B2 | 5/2019 | Yasufuku et al. |
| 2004/0102601 | A1 * | 5/2004 | Saito ............ C08L 63/00 528/271 |
| 2005/0107495 | A1 | 5/2005 | Wind et al. |
| 2006/0097403 | A1 * | 5/2006 | LeBonheur ...... H01L 23/293 257/778 |
| 2009/0104429 | A1 | 4/2009 | Goto et al. |
| 2010/0120315 | A1 | 5/2010 | Imashiro et al. |
| 2010/0247908 | A1 | 9/2010 | Velev et al. |
| 2012/0178332 | A1 | 7/2012 | Uchida et al. |
| 2014/0256873 | A1 * | 9/2014 | Shenoy ............ B01D 39/1623 524/606 |

FOREIGN PATENT DOCUMENTS

| | | |
|---|---|---|
| JP | 2010-84252 A | 4/2010 |
| JP | 2011-214170 A | 10/2011 |
| JP | 2013-141044 A | 7/2013 |
| WO | 2011/052175 A1 | 3/2013 |

* cited by examiner

METHOD OF PRODUCING A POLYMER NANOFIBER SHEET

CROSS-REFERENCE TO RELATED APPLICATIONS

This application is a divisional application of U.S. patent application Ser. No. 14/603,782, filed Jan. 23, 2015, which claims the benefit of Japanese Patent Application No. 2014-016616, filed on Jan. 31, 2014. Both of these prior applications are hereby incorporated by reference herein in their entirety.

BACKGROUND OF THE INVENTION

Field of the Invention

The present invention relates to a polymer nanofiber sheet and a method of producing the sheet.

Description of the Related Art

In recent years, a polymer nanofiber structural body typified by a polymer nanofiber sheet in which a plurality of nanofibers each formed of a polymer are laminated and hence the nanofibers are three-dimensionally entangled with each other has been attracting attention as a material having a large specific surface area.

However, the related-art polymer nanofiber structural body formed by the three-dimensional entanglement is merely formed by the physical entanglement of the fibers. Accordingly, the structural body has involved problems in terms of practical use. Specifically, the structural body necessarily has a low mechanical strength, and tends to be weak against a tensile force and friction. In view of the foregoing, an approach for increasing the mechanical strength in the polymer nanofiber structural body has started to be developed. Japanese Patent Application Laid-Open No. 2011-214170 discloses an approach to obtaining a polymer nanofiber structural body increased in strength, the approach involving heating a thread-like polymer nanofiber structural body formed by twisting a plurality of polymer nanofibers to perform partial bonding treatment for partially bonding the polymer nanofibers. In addition, Japanese Patent Application Laid-Open No. 2010-84252 discloses an approach involving joining, in a laminate formed of polymer nanofibers, at least part of the polymer nanofibers constituting the laminate through a crosslinking material to increase its strength, and a water-resistant and moisture-permeable laminate obtained by the approach.

However, the approach of Japanese Patent Application Laid-Open No. 2011-214170 has difficulty in, for example, controlling a temperature, and depending on conditions, the nanofibers melt to a large extent and hence the diameter of each of the fibers constituting the structural body becomes several micrometers or more in some cases. As a result, the specific surface area of the nanofiber structural body itself reduces in some cases. In addition, the approach of Japanese Patent Application Laid-Open No. 2010-84252 may be unable to provide a structural body having a sufficient strength depending on the crosslinking material to be used.

SUMMARY OF THE INVENTION

According to one embodiment of the present invention, there is provided a polymer nanofiber sheet, including polymer nanofibers, the polymer nanofibers being laminated and three-dimensionally entangled with each other, in which: at least part of the polymer nanofibers are crosslinked at a crosslinked part having crosslinking portions and a non-crosslinking portion; and the crosslinked part contains a low-molecular weight epoxy compound having a molecular weight of from 100 to 3,000.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

The present invention has been made to solve the problems, and an object of the present invention is to provide a polymer nanofiber sheet having high delamination resistance, a high mechanical strength, and a high specific surface area, and a method of producing the sheet.

Embodiments of the present invention are described below. The present invention relates to a polymer nanofiber sheet, including polymer nanofibers, the polymer nanofibers being laminated and three-dimensionally entangled with each other. In the present invention, at least part of the polymer nanofibers is crosslinked at a crosslinked part having crosslinking portions and a non-crosslinking portion. In addition, in the present invention, the crosslinked part constituting the polymer nanofiber sheet contains a low-molecular weight epoxy compound having a molecular weight of from 100 to 3,000. It should be noted that in the present invention, when the low-molecular weight epoxy compound contains a low-molecular weight polymer, the term "molecular weight" refers to a number-average molecular weight (Mn).

The polymer nanofiber sheet of the present invention is hereinafter described with reference to the drawings.

<Polymer Nanofiber Sheet>

Figure 1A:
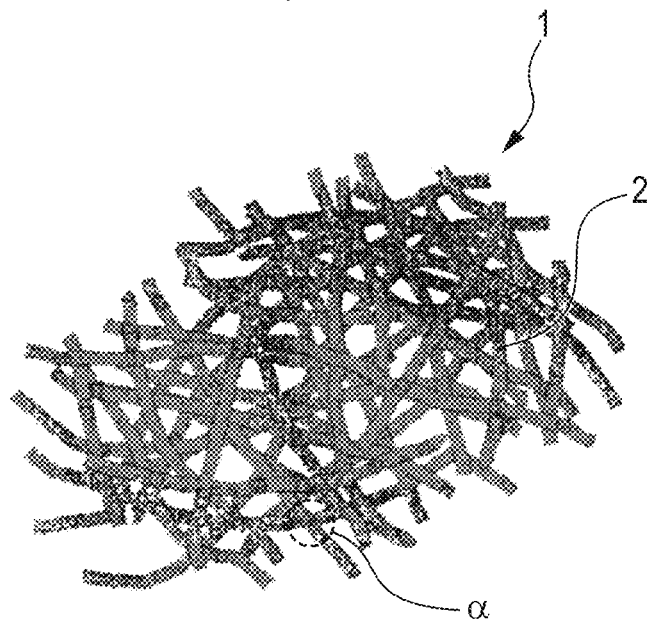
FIG. 1A and FIG. 1B are each a schematic view illustrating an example of a polymer nanofiber sheet of the present invention.
Figure 1B:
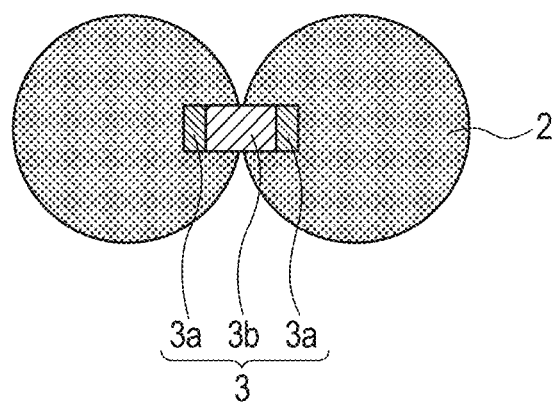

FIG. 1A and FIG. 1B are each a schematic view illustrating a polymer nanofiber sheet according to an exemplary embodiment of the present invention. FIG. 1A illustrates a schematic view of the sheet and FIG. 1B is an enlarged sectional view of an α portion in FIG. 1A.

A polymer nanofiber sheet 1 of FIG. 1A is a sheet-like structural member in which a plurality of polymer nanofibers 2 are laminated and three-dimensionally entangled with each other. As described above, the polymer nanofiber sheet of the present invention includes the polymer nanofibers 2 and hence a moderate space is formed between the plurality of polymer nanofibers 2 entangled with each other. Therefore, the polymer nanofiber sheet of the present invention necessarily has a high specific surface area.

In addition, as illustrated in FIG. 1B, the polymer nanofiber sheet of the present invention includes the polymer nanofibers 2 and a crosslinked part 3 for linking the polymer nanofibers 2. The crosslinked part 3 has crosslinking portions 3a at both of its terminals and a non-crosslinking portion 3b located between the crosslinking portions 3a. In addition, the crosslinked part 3 contains a low-molecular weight epoxy compound having a molecular weight or number-average molecular weight of from 100 to 3,000. Accordingly, the crosslinked part 3 is provided in a state of being satisfactorily dispersed in the polymer nanofibers 2, and as a result, the polymer nanofibers 2 are entangled with each other while strongly crosslinking with each other at a predetermined site (point of intersection) where the crosslinked part 3 is provided.

Incidentally, the crosslinking portions 3a in the crosslinked part 3 are each formed by (A) a chemical reaction between each polymer nanofiber 2 and the low-molecular weight epoxy compound, or (B) a physical interaction between the polymer nanofiber 2 and the low-molecular weight epoxy compound. Here, the reaction (A) is called chemical crosslinking and the interaction (B) is called physical crosslinking. Details about the reaction and the interaction are described later.

Here, when the crosslinking portions 3a are each formed by the chemical crosslinking upon formation of the crosslinked part 3 from the low-molecular weight epoxy compound, the crosslinked part 3 has a flexible joining structure based on an spa hybrid orbital (such as an oxygen atom or a methylene group) excellent in molecular rotatability. Accordingly, the crosslinked part 3 is a partial structure that is not brittle and is flexible. Incidentally, the aspect of the crosslinking of the polymer nanofibers 2 by the crosslinked part 3 is not limited to crosslinking in a state in which the polymer nanofibers 2 are brought into contact with each other as illustrated in FIG. 1B. The aspect includes, for example, crosslinking in a state in which a nano-level interval is provided between the polymer nanofibers 2.

As described above, the crosslinked part is moderately provided between the polymer nanofibers of the polymer nanofiber sheet of the present invention. Accordingly, delamination resistance and the mechanical strength between the polymer nanofibers are high, and the delamination and falling of the polymer nanofibers due to an external factor such as rubbing hardly occur. In addition, the delamination and falling of the polymer nanofibers hardly occur, and hence the specific surface area of the polymer nanofiber sheet does not reduce owing to the external factor. It should be noted that the specific surface area of the polymer nanofiber sheet depends on, for example, the fiber diameters of the polymer nanofibers constituting the sheet and the number of the polymer nanofibers, and the diameters and the number only need to be appropriately selected in accordance with desired characteristics.

In the polymer nanofiber sheet of the present invention, the number of polymer nanofibers present in an arbitrary section, an interval between adjacent nanofibers, and the number of laminated nanofibers can be appropriately selected in accordance with the desired characteristics of the polymer nanofiber sheet. In the case of, for example, the polymer nanofiber sheet 1 of FIG. 1A, the plurality of polymer nanofibers 2 are randomly placed and the polymer nanofibers 2 are crosslinked with each other at a predetermined point of intersection to form the polymer nanofiber sheet 1. At least part of the plurality of polymer nanofibers 2 adjacent to each other are crosslinked at a point of intersection by the crosslinked part containing the low-molecular weight epoxy compound having a molecular weight (number-average molecular weight) of from 100 to 3,000. Accordingly, a strong and flexible network is formed.

As a result, the polymer nanofiber sheet of the present invention is advantageous for long-term use because the sheet has high delamination resistance and a high mechanical strength, and the polymer nanofibers do not easily fray off each other.

<Polymer Nanofiber>

The polymer nanofibers of the present invention are each a fiber including at least one kind of polymer, having a length longer than that of its thickness, and containing the low-molecular weight epoxy compound having a molecular weight (number-average molecular weight) of from 100 to 3,000 at the stage of a sheet-forming step. It should be noted that the term "contain" as used herein is not limited to the case where the low-molecular weight epoxy compound is present in the fiber, and includes the case where the low-molecular weight epoxy compound is present on the surface of the fiber.

In the present invention, the average diameter of the polymer nanofibers serving as an indicator of a thickness, which is not particularly limited, is preferably 1 nm or more and less than 10,000 nm. In particular, the average diameter is more preferably less than 1,000 nm in order that a polymer nanofiber sheet having a high specific surface area may be obtained. It should be noted that when the average diameter of the polymer nanofibers is less than 1 nm, the polymer nanofibers themselves become difficult to handle from the viewpoint of producing the polymer nanofiber sheet. Meanwhile, from the viewpoint of the ease of handling of the polymer nanofibers, the average diameter is preferably 50 nm or more because the nanofibers tend to be easy to handle.

In the present invention, the sectional shapes of the polymer nanofibers are not particularly limited, and specific examples thereof include a circular shape, an elliptical shape, a quadrangular shape, a polygonal shape, and a semicircular shape. It should be noted that the sectional shape of each of the polymer nanofibers may not be any such accurate shape as listed above, and the shapes of arbitrary sections of the nanofiber may be different from each other.

Here, when it is hypothesized that the shape of each of the polymer nanofibers is a cylindrical shape, the diameter of a circle serving as a section of the cylinder corresponds to the thickness of the polymer nanofiber. In addition, when the shape of the polymer nanofiber is not a cylindrical shape, the thickness of the polymer nanofiber refers to the length of the longest straight line passing a center of gravity in a section of the polymer nanofiber. It should be noted that in the present invention, the length of the polymer nanofiber is typically 10 or more times as large as its thickness.

The shapes of the polymer nanofibers (such as the sectional shapes of the fibers and the diameters of the fibers) can be confirmed by direct observation based on measurement with a scanning electron microscope (SEM) or a laser microscope.

In the present invention, the polymer nanofibers are not particularly limited as long as the polymer nanofibers each contain at least an organic polymer component. A conventionally known polymer material can be used as the organic polymer, and one kind of such materials may be used alone, or two or more kinds thereof may be used in combination. In addition, a material containing a fine particle or a conventionally known filler can be used as the organic polymer, and the polymer can be formed by appropriately combining such materials.

The polymer material serving as the polymer nanofibers constituting the polymer nanofiber sheet of the present invention is not particularly limited as long as the material forms a fibrous structure. Specific examples thereof include:

an organic material typified by a resin material; and a hybrid material of the organic material and an inorganic material such as silica, titania, or a clay mineral.

Here, examples of the polymer material may include: a fluorine-containing polymer (such as tetrafluoroethylene or polyvinylidene fluoride (PVDF); a copolymer of a fluorine-containing polymer and any other monomer (such as a copolymer of PVDF and hexafluoropropylene (PVDF-HFP)); a polyolefin-based polymer (such as polyethylene or polypropylene); polystyrene (PS); a polyarylene (aromatic polymer such as polyparaphenylene oxide, poly(2,6-dimethylphenylene oxide), or polyparaphenylene sulfide); polyimide; polyamide; polyamide imide; polybenzimidazole; a modified polymer obtained by introducing a sulfonic group ($-SO_3H$), a carboxy group ($-COOH$), a phosphoric group, a sulfonium group, an ammonium group, or a pyridinium group into a polyolefin-based polymer, polystyrene, polyimide, or a polyarylene (aromatic polymer); a modified polymer obtained by introducing a sulfonic group, a carboxy group, a phosphoric group, a sulfonium group, an ammonium group, or a pyridinium group into a skeleton of a fluorine-containing polymer; a polybutadiene-based compound; a polyurethane-based compound (including an elastomer-like compound or a gel-like compound); a silicone-based compound; polyvinyl chloride; polyethylene terephthalate; nylon; polyarylate and a biodegradable polymer (such as polycaprolactone (PCL) or polylactic acid); a polyether (such as polyethylene oxide (PEO) or polybutylene oxide); and a polyester (PES) (such as polyethylene terephthalate (PET)).

It should be noted that one kind of the polymer materials listed above may be used alone, or two or more kinds thereof may be used in combination. In addition, in the polymer material other than the polyolefin-based polymer, polystyrene, polyimide, the polyarylene, and the fluorine-containing polymer, there may be used a modified polymer obtained by introducing a sulfonic group, a carboxy group, a phosphoric group, a sulfonium group, an ammonium group, or a pyridinium group. Further, a copolymer obtained by copolymerizing a plurality of kinds of monomers may be used. In addition, in the case of a polymer material that is hardly caused to melt such as polyimide, polyamide, polyamide imide (PAI), or polybenzimidazole (PBI), the polymer material may be used in combination with, for example, a thermoplastic resin.

Examples of the inorganic material that can be used together with the organic polymer may include oxides of metal materials selected from Si, Mg, Al, Ti, Zr, V, Cr, Mn, Fe, Co, Ni, Cu, Sn, and Zn. More specific examples thereof may include metal oxides such as silica ($SiO_2$), titanium oxide, aluminum oxide, alumina sol, zirconium oxide, iron oxide, and chromium oxide. In addition, a clay mineral such as montmorillonite (MN) may be used. Here, an inorganic material is preferably incorporated into each of the polymer nanofibers from the viewpoint of an improvement in durability of the sheet because its mechanical strength tends to increase significantly upon joining of the polymer nanofibers.

In the present invention, the polymer nanofibers each preferably contain a functional group constituting the low-molecular weight epoxy compound. This is because the low-molecular weight epoxy compound can be easily dispersed in each of the polymer nanofibers in an additionally uniform manner, and as a result, the joining of the nanofibers by crosslinking can be performed satisfactorily and easily. Here, the phrase "the polymer nanofibers each contain a functional group constituting the low-molecular weight epoxy compound" means that the following condition (a) or (b) is satisfied:

(a) a functional group in a repeating structure constituting each of the polymer nanofibers is the same as, or similar to, at least part of a functional group included in a skeleton constituting the non-crosslinking portion of the low-molecular weight epoxy compound; and (b) a substituent containing oxirane is introduced into the polymer material constituting the polymer nanofibers.

The condition (a) or (b) is preferably satisfied from the viewpoint of the improvement in durability because the mechanical strength of the polymer nanofiber material in the present invention tends to increase significantly. Here, the condition (a) is particularly preferably satisfied because a crosslinked structure can be formed by a method except a method involving causing the polymer material serving as the polymer nanofibers and the low-molecular weight epoxy compound to directly react with each other. It should be noted that the term "similar" in the condition (a) means that a kind of functional groups to be compared to each other are the same.

Here, examples of the functional group in the repeating structure constituting each of the polymer nanofibers, the functional group being a substituent serving as at least part of the functional group constituting the non-crosslinking portion, include an ether group, an aromatic ring, and a carbonyl group.

In addition, the repeating structure constituting each of the polymer nanofibers preferably includes an imide structure because the repeating structure tends to have a high mechanical strength in addition to heat resistance by virtue of the rigid and strong molecular structure of the imide structure. Accordingly, the following tendency is observed: the resultant polymer nanofibers hardly deform after a crosslinking step as compared to their shapes before the step, and a polymer nanofiber sheet having a high specific surface area is obtained. Thus, the mechanical strength of the polymer nanofiber sheet significantly increases, which is preferred from the viewpoint of the improvement in durability.

<Low-Molecular Weight Epoxy Compound>

In the present invention, the crosslinked part for crosslinking the polymer nanofibers is formed of a crosslinking agent. The low-molecular weight epoxy compound is used as the crosslinking agent in the present invention. In the present invention, the low-molecular weight epoxy compound is not particularly limited as long as its molecular weight (number-average molecular weight) is from 100 to 3,000, and a conventionally known low-molecular weight epoxy compound can be used.

In the present invention, an oligomer (low-molecular weight polymer) is also included in the low-molecular weight epoxy compound. Here, a molecular weight of the oligomer can be evaluated by using a number-average molecular weight (Mn) that can be generally determined by gel permeation chromatography (GPC).

The molecular weight (number-average molecular weight) of the low-molecular weight epoxy compound to be used upon production of the polymer nanofiber sheet of the present invention is from 100 to 3,000 from the viewpoint of its uniform dispersibility in the polymer material. The molecular weight (number-average molecular weight) is preferably from 170 to 2,700. In other words, when the molecular weight (number-average molecular weight) is 3,000 or less, the low-molecular weight epoxy compound can be uniformly dispersed in the polymer material. When the molecular weight (number-average molecular weight) exceeds 3,000, it becomes difficult for the epoxy compound and the polymer material to be uniformly compatible with each other. Here, the phrase "the epoxy compound and the polymer material are not uniformly compatible with each other" refers to a phenomenon such as: opacification at the stage of mixing the polymer material and the epoxy compound; or phase separation therebetween in the sheet-forming step. Unless the epoxy compound is uniformly compatible in each of the polymer nanofibers, the area of a portion for crosslinking the nanofibers constituting the nanofiber sheet (region where the nanofibers intersect each other) reduces, and as a result, joining between the fibers does not become sufficient. In addition, when the molecular weight (number-average molecular weight) is 100 or more, the volatility of the low-molecular weight epoxy compound reduces and hence the low-molecular weight epoxy compound does not volatilize in a production process for the nanofibers. This is also a desired condition for the uniform dispersion of the low-molecular weight epoxy compound in each of the polymer nanofibers.

Any compound can be used as the low-molecular weight epoxy compound without any particular limitation as long as the compound has two or more crosslinking functional groups in a molecule thereof. Here, the crosslinking functional groups are each mainly oxirane but are not limited thereto, and a double bond or the like is also permitted. In this regard, however, at least one of the plurality of crosslinking functional groups in the low-molecular weight epoxy compound is oxirane. It should be noted that the crosslinking functional groups are substituents serving as a basis for the crosslinking portions (each represented by reference symbol 3a in FIG. 1B) in the crosslinked part constituting the polymer nanofiber sheet of the present invention.

Meanwhile, a substituent in the low-molecular weight epoxy compound, the substituent not being altered in the crosslinking step to be described later, is a substituent serving as the non-crosslinking portion (represented by reference symbol 3b in FIG. 1B) in the crosslinked part constituting the polymer nanofiber sheet of the present invention.

In the present invention, examples of the low-molecular weight epoxy compound include a bisphenol A-type epoxy resin, a bisphenol F-type epoxy resin, a bisphenol S-type epoxy resin, an alicyclic epoxy resin, a phenol novolac-type epoxy resin, a cresol novolac-type epoxy resin, a bisphenol A novolac-type epoxy resin, a diglycidyl etherified product of a polyfunctional phenol, a diglycidyl etherified product of a polyfunctional alcohol, a halogenated product thereof, and a hydrogenated product thereof. In addition, a plurality of kinds of those compounds may be used in combination.

Of those, for example, a bifunctional epoxy compound is preferably used. Here, a conventionally known compound such as a bisphenol A-type epoxy compound, a bisphenol F-type epoxy compound, a bisphenol S-type epoxy compound, an aliphatic chain epoxy compound, poly(ethylene glycol) diglycidyl ether, or 4-hydroxybutyl acrylate glycidyl ether may be used as the bifunctional epoxy compound. In particular, for example, EPIKOTE 1007 (Mn=2,600) (manufactured by Japan Epoxy Resin Co., Ltd.), AER-6017 (Mn=2,700) (Asahi Kasei Epoxy Co., Ltd.), or EPOTOHTO YD-017 (Mn=2,600) (manufactured by Tohto Kasei Co., Ltd.) may be used among commercially available bisphenol-type epoxy compounds.

<Method of Producing Polymer Nanofiber Sheet>

Next, a method of producing the polymer nanofiber sheet of the present invention is specifically described.

The method of producing the polymer nanofiber sheet of the present invention only needs to include at least the following steps (i) and (ii) in terms of the ease with which the sheet is produced, and a step except the steps is not particularly limited:

(i) a step of spinning a polymer solution containing a low-molecular weight epoxy compound having a molecular weight (number-average molecular weight) of from 100 to 3,000 to form a polymer nanofiber sheet [sheet-forming step]; and (ii) a step of joining at least part of polymer nanofibers forming the polymer nanofiber sheet through heating treatment [crosslinking step].

<Sheet-Forming Step>

In the present invention, upon production of the polymer nanofiber sheet, the polymer nanofibers constituting the sheet need to be formed. Here, a method of forming the polymer nanofibers, which is not particularly limited, is, for example, an electrospinning method or a melt-blow method. It should be noted that in the present invention, only one kind of the methods may be selected and employed, or two or more kinds thereof may be selected and employed in combination. It should be noted that the electrospinning method out of the listed methods is a method involving forming the polymer nanofibers in a state in which a high voltage is applied between the polymer solution in a syringe and a collector electrode. When the method is adopted, the solution extruded from the syringe is provided with charge to scatter in an electric field, but as a time elapses, a solvent in the scattered solution evaporates, and as a result, a thinned solute appears. The thinned solute becomes the polymer fibers to adhere to a collector such as a substrate.

The nanofibers are preferably produced through spinning by the electrospinning method having the following advantages (i) to (iii) out of the production methods listed above:

(i) various polymers can be spun into fiber shapes;

(ii) it is relatively easy to control a fiber shape and a fiber having a thickness ranging from several nanometers to several tens of micrometers can be easily obtained; and (iii) a production process is simple.

Figure 2:
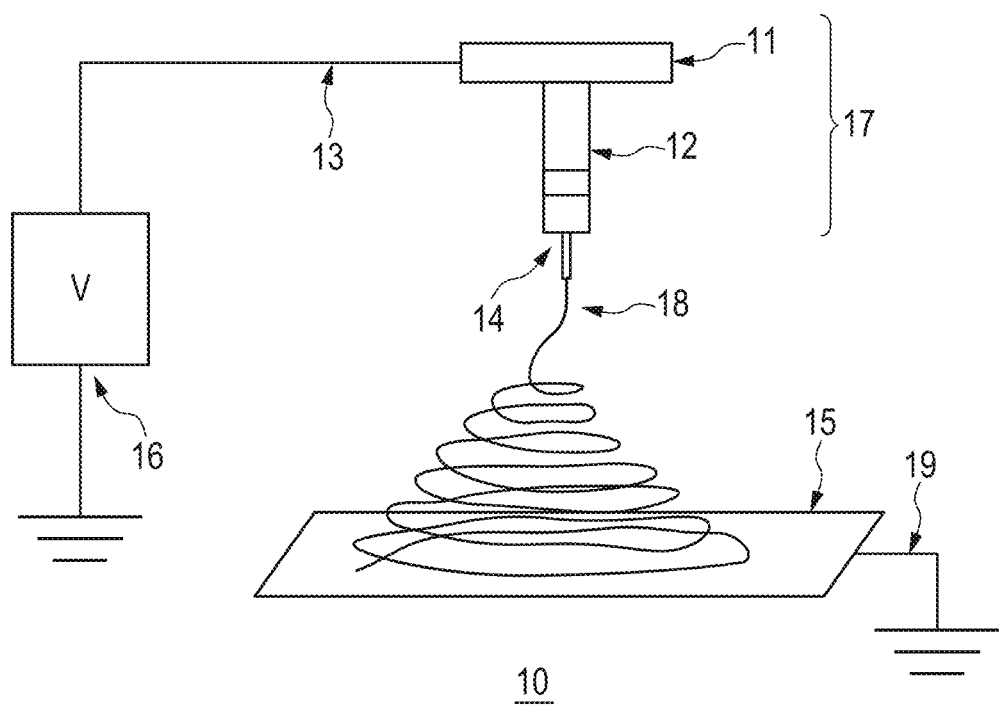
FIG. 2 is a schematic view illustrating an example of an apparatus for producing the polymer nanofiber sheet of the present invention.

Here, the method of producing the polymer nanofiber sheet based on the spinning of the polymer nanofibers by the electrospinning method is described with reference to the drawings. FIG. 2 is a schematic view illustrating an example of an apparatus for producing the polymer nanofiber sheet of the present invention.

A production apparatus 10 illustrated in FIG. 2 specifically adopts a method involving extruding a polymer solution stored in a storage tank 12 from a spinning nozzle 14. It should be noted that the polymer solution extruded from the spinning nozzle 14 scatters in various directions and hence a polymer nanofiber sheet in which spun polymer nanofibers are three-dimensionally entangled with each other is naturally produced. Accordingly, there is no need to twist the spun polymer nanofibers in a later step.

Next, a constituent member for the production apparatus 10 of FIG. 2 is described. The storage tank 12 for storing the polymer solution is arranged through a connecting portion 11. It should be noted that the connecting portion 11 is electrically connected to a high-voltage power source 16 through a wiring. In addition, the connecting portion 11 and the storage tank 12 are each a constituent member for a head 17. A collector 15 on which the spun polymer nanofibers are collected is arranged so as to face the head 17 with a certain interval therebetween. It should be noted that the collector 15 is connected to the ground by a wiring 19.

The polymer solution is extruded from the tank 12 to the spinning nozzle 14 at a constant rate. A voltage of from 1 kV to 50 kV is applied to the spinning nozzle, and when electrical attraction exceeds the surface tension of the polymer solution, a jet 18 of the polymer solution is injected toward the collector 15. At this time, a solvent in the jet gradually volatilizes, and upon arrival of the jet at the collector 15, a corresponding polymer nanofiber is obtained. Here, the polymer solution set to a condition under which the solution is turned into nanofibers is introduced into the tank 12 and spun.

It should be noted that what is stored in the tank 12 upon spinning is not limited to the polymer solution and a molten polymer heated to its melting point or more may be utilized.

<Step of Joining Polymer Nanofibers (Crosslinking Step)>

In the present invention, the expression "joining of the polymer nanofibers" refers to a state in which at least a polymer nanofiber is fixed by chemically or physically crosslinking with an adjacent polymer nanofiber without any change in fiber diameter after the crosslinking step as compared to a fiber diameter before the step. It should be noted that the phrase "without any change in fiber diameter" means that the average diameter of the polymer nanofibers changes only by less than ±10% (preferably less than ±5%) after the crosslinking step as compared to that before the step.

In the present invention, the chemical crosslinking means formation of the crosslinked part derived from the low-molecular weight epoxy compound and intended for the linking of the polymer nanofibers each other, and the crosslinked part is formed through a chemical reaction between each polymer nanofiber and the low-molecular weight epoxy compound. It should be noted that the term "chemical reaction" as used herein refers to a chemical reaction between an oxirane group and a nucleophilic substituent, and example of the nucleophilic substituent is substituent having active hydrogen such as a hydroxy group, a carboxy group, and amino groups (a primary amino group and a secondary amino group). In a situation in which the Friedel-Crafts reaction can be applied, an aromatic ring such as a benzene ring can also be included in the category of the nucleophilic substituent.

On the other hand, the physical crosslinking means that each polymer nanofiber and the low-molecular weight epoxy compound associate with each other by virtue of a hydrogen bond or an intermolecular force (van der Waals force) to form the crosslinked part. Here, when the functional group in the repeating structure constituting the polymer nanofiber is the same as, or similar to, at least part of the functional group included in a skeleton constituting the non-crosslinking portion of the low-molecular weight epoxy compound, the polymer nanofiber and the low-molecular weight epoxy compound can be physically crosslinked with each other.

In the present invention, a method of joining the polymer nanofibers is an approach involving subjecting the polymer nanofiber sheet obtained by spinning to heating treatment. Here, a specific method for the heating treatment is not particularly limited. For example, heating with a heater, heating with warm air, heating with an infrared ray, heating with a microwave, or heating with an ultrasonic wave can be employed, and any such method only needs to be appropriately selected depending on a situation in which the method is employed and the like.

Specifically, for example, a method involving subjecting the polymer nanofiber sheet to hot pressing, a method involving heating the sheet with an industrial dryer, oven, or the like to treat the sheet, or a method involving warming the sheet with a heater once and then further subjecting the sheet to post-heating with an oven can be suitably employed. Of those, a method involving subjecting the sheet to heating treatment with an oven can be particularly suitably employed because the temperature of the entire material can be easily uniformized without any unevenness.

The temperature at which the heating treatment is performed is not particularly limited as long as the temperature is less than the decomposition temperature of the polymer material constituting the polymer nanofibers, and the temperature only needs to be appropriately selected depending on, for example, the polymer material to be used and the desired physical properties of the polymer nanofiber sheet as described above. For example, the heating temperature is preferably from 30° C. to 250° C. and is suitably at least less than the melting point (Tm) of each of the polymer nanofibers. It should be noted that the temperature at which the heating treatment is performed is extremely suitably less than the glass transition point (Tg) of each of the polymer nanofibers because the shapes of the polymer nanofibers can be easily maintained.

<Latent Catalyst>

In the present invention, a conventionally known latent catalyst can be added and used in order to effectively form the crosslinking (mainly chemical crosslinking) with the low-molecular weight epoxy compound. It should be noted that the latent catalyst refers to a catalyst that generates, through a predetermined stimulus such as heat, a reaction active species (a cation, an anion, or a radical) that accelerates the crosslinking with the low-molecular weight epoxy compound, and the catalyst is, for example, an acid generator.

When the latent catalyst is used in the present invention, the latent catalyst is preferably a thermal cationic polymerization initiator that generates a cation through heat. The thermal cationic polymerization initiator is inert at normal temperature. However, when the initiator is heated to reach its critical temperature (reaction starting temperature), the initiator cleaves to generate the cation. The cation advances the crosslinking with the low-molecular weight epoxy compound. Examples of such compound include: an organic metal complex such as an aluminum chelate complex, an iron-arene complex, a thitanocene complex, or an arylsilanol-aluminum complex; and a quaternary ammonium salt-type compound, phosphonium salt-type compound, iodonium salt-type compound, or sulfonium salt-type compound having, for example, an antimony hexafluoride ion ($SbF_6^-$), antimony tetrafluoride ion ($SbF_4^-$), arsenic hexafluoride ion ($AsF_6^-$), or phosphorus hexafluoride ion ($PF_6^-$) as an anion component.

It should be noted that when the thermal cationic polymerization initiator is used, the catalyst preferably acts at a temperature equal to or less than the decomposition temperature of the polymer material to be used.

Hereinafter, the present invention is described by way of Examples. However, the present invention is not limited to Examples to be described below. In addition, those obtained by appropriately changing or modifying Examples to be described below to the extent that such change or modification do not deviate from the gist of the present invention are also included in the present invention.

<Measurement Method and Evaluation Method>

(1) Average Fiber Diameter of Polymer Nanofibers

A polymer nanofiber sheet was subjected to measurement with a scanning electron microscope (SEM) and the resultant image was captured in image analysis software "Image J" to provide an image. After that, 50 arbitrary points were sampled from the projected image of polymer nanofibers, and the respective widths of the polymer nanofibers at the respective points were measured. Thus, the average fiber diameter of the polymer nanofibers was determined.

(2) IR Measurement of Polymer Nanofiber Sheet

The polymer nanofiber sheet was subjected to IR measurement. Specifically, whether or not an epoxy compound reacted in a crosslinking step was confirmed based on whether or not a reduction in peak derived from an epoxy (around from 950 $cm^{-1}$ to 810 $cm^{-1}$) and an increase in peak derived from an ether formed through the reaction of the epoxy compound (around from 1,100 $cm^{-1}$ to 1,200 $cm^{-1}$) were observed. In addition, whether or not the epoxy compound was uniformly dispersed in the polymer nanofiber sheet was confirmed based on whether or not the same peak pattern was obtained in the IR measurement at 10 arbitrary points of the polymer nanofiber sheet.

(3) Simple Friction Test of Polymer Nanofiber Sheet

The surface of the polymer nanofiber sheet was lightly rubbed with the pulp of a finger. After that, the sheet was directly observed with a laser microscope to confirm the presence or absence of the delamination of a polymer nanofiber constituting the sheet and the presence or absence of the occurrence of a wrinkle. It can be confirmed that the polymer nanofibers are crosslinked with each other at a crosslinked part based on the fact that none of the delamination and the wrinkle occurs. It should be noted that when no crosslinking treatment is performed, delamination or a wrinkle large enough to be observable with the eyes is observed.

(4) Evaluation of Polymer Nanofiber Sheet for its Delamination Resistance

Delamination resistance between the polymer nanofibers constituting the polymer nanofiber sheet was tested and evaluated by the following method.

The following simple tape delamination test was performed: adhesive tapes (DIATEX Co., Ltd.: Y-03-BL, 0.160 N/mm) were attached to both surfaces of the polymer nanofiber sheet, and were vertically delaminated with an Instron tester (Shimadzu: EZ-test). Specifically, 10 arbitrary points (observation points) were marked on the surface of the polymer nanofiber sheet in advance, and the simple tape delamination test was performed in a range including all the observation points. Then, the extents to which a polymer nanofiber covering another polymer nanofiber delaminated were observed with a laser microscope before and after the test, and the results were evaluated by the following three stages A to C.

A: No delamination of a polymer nanofiber is observed in all the observation points.
B: The delamination of a polymer nanofiber is observed in 1 to 4 observation points.
C: The delamination of a polymer nanofiber is observed in 5 or more observation points.

It should be noted that the three kinds of evaluations are as follows: A means good, B means acceptable, and C means unacceptable. That is, the order of degrees of crosslinking is as follows: A>>B>C. Accordingly, the evaluation A means that the delamination resistance between the polymer nanofibers is high. Accordingly, the order of the eases with which such a polymer nanofiber sheet that the delamination and falling of nanofibers, and a reduction in specific surface area of the polymer nanofiber sheet due to an external factor such as rubbing are absent is obtained is as follows: A>B>C.

(5) Evaluation of Polymer Nanofiber Sheet for its Mechanical Strength

The polymer nanofiber sheet was tested and evaluated for its mechanical strength by the following method.

The polymer nanofiber sheet was evaluated for its mechanical strength by measuring the Young's moduli of the polymer nanofiber sheet before and after the crosslinking step. Specifically, the Young's moduli of the sheet before and after the crosslinking step were determined by tensile characteristic measurement with Autograph ("AG-Xplus" manufactured by Shimadzu Corporation), and the ratio at which the Young's modulus increased was calculated from the following equation [A].

Ratio at which Young's modulus increases [%]=Young's modulus after crosslinking step/ Young's modulus before crosslinking step×100    [A]

It should be noted that a higher ratio at which the Young's modulus increases means a higher degree of crosslinking of the polymer nanofibers in the polymer nanofiber sheet, and as a result, shows that the mechanical strength of the polymer nanofiber sheet increases. Accordingly, a polymer nanofiber sheet in which the ratio at which the Young's modulus increases is high can be used over a long time period.

(6) Evaluation of Polymer Nanofibers for Shape Changes

Changes in shapes of the polymer nanofibers after the crosslinking step as compared to those before the step were tested and evaluated by the following method.

Specifically, the polymer nanofiber sheet was observed with a scanning electron microscope (SEM) (a laser microscope is permitted) before and after the crosslinking step, and the resultant images were captured in image analysis software "Image J". Next, the respective polymer nanofiber widths of polymer nanofibers at 50 arbitrary points, which had been selected from a surface (upper surface) vertical to the thickness direction of the polymer nanofiber sheet, were measured before and after the crosslinking step. Then, a shape change ratio was calculated from the following equation [B] based on the widths of the polymer nanofiber before and after the crosslinking step at each observation point. Then, the degree of the shape change ratio was evaluated by the following three stages I to III based on the result.

Shape change ratio [%]=(fiber width after crosslinking step−fiber width before crosslinking step)/ fiber width before crosslinking step×100    [B]

I: No conspicuous change in polymer nanofiber diameter is observed in all the observation points (the change ratio is less than ±5%).
II: A change in polymer nanofiber diameter is observed (the change ratio is ±5% or more and less than ±10%).
III: A change in polymer nanofiber diameter is observed and the change is large (the change ratio is ±10% or more).

It should be noted that a state in which a nanofiber diameter is maintained after the crosslinking step as compared to that before the step to a larger extent and hence the change in shape of a polymer nanofiber is smaller means that the resultant porous sheet has a larger specific surface area.

Example 1

[Preparation of Polymer Solution]

Polycaprolactone (PCL, molecular weight: 80,000, manufactured by Sigma-Aldrich) as a polymer material and poly(ethylene glycol) diglycidyl ether as a low-molecular weight epoxy compound were mixed. At this time, a mixing ratio between the PCL and the poly(ethylene glycol) diglycidyl ether was set to 92:8 in terms of a weight ratio. Next, the mixture was further mixed with a mixed solution obtained by mixing dichloromethane (DCM) and dimethylformamide (DMF). Thus, 1 mL of a solution of the polymer material having a concentration of 10 wt % was prepared. At this time, a mixing ratio between DCM and DMF was set to 75:25 (volume ratio). Next, SI-60L (manufactured by SANSHIN CHEMICAL INDUSTRY CO., LTD.) which is an aromatic sulfonium salt-based latent catalyst was mixed at a ratio of 10 wt % with respect to the low-molecular weight epoxy compound.

[Sheet-Forming Step]

The prepared solution was injected and spun by an electrospinning method. Thus, a polymer nanofiber sheet formed by the physical entanglement of polymer nanofibers each including the PCL containing the poly(ethylene glycol) diglycidyl ether was produced. Specifically, an electrospinning apparatus (manufactured by MECC Co., Ltd.) illustrated in FIG. 2 was provided with a head 17 (clip spinneret) for spinning the prepared solution. Next, the head was provided with the tank 12 filled with the prepared solution. Next, a voltage of 17 kV was applied to the spinning nozzle 14 to inject the solution filled into the tank 12 toward the collector 15 for 10 minutes. Thus, a corresponding polymer nanofiber sheet was obtained.

[Crosslinking Step]

The resultant polymer nanofiber sheet was sandwiched between glass plates. After that, the resultant was placed in an oven and subjected to heating treatment at 80° C. for 2 hours. Thus, a polymer nanofiber sheet in which the polymer nanofibers were crosslinked by a poly(ethylene glycol) diglycidyl ether derivative (crosslinked part) was obtained.

Table 1 shows the results of the evaluations. It should be noted that the average fiber diameter of the polymer nanofibers constituting the polymer nanofiber sheet after the crosslinking step was 0.95 μm.

Example 2

[Preparation of Polymer Solution]

Polyethylene oxide (PEO, manufactured by Sigma-Aldrich) as a polymer material and pure water were mixed to prepare 2 ml of a 6 wt % aqueous solution of the PEO. Next, the aqueous solution of the PEO was mixed with ethylene glycol diglycidyl ether (Mw=174) as a low-molecular weight epoxy compound. At this time, the amount in which the low-molecular weight epoxy compound was mixed was adjusted so that the ratio of the low-molecular weight epoxy compound to the PEO became 10 wt %. Further, the latent catalyst used in Example 1 was mixed at the same ratio as that of Example 1.

[Sheet-Forming Step]

A polymer nanofiber sheet was obtained in the same manner as in Example 1 except that conditions shown in Table 1 were adopted.

[Crosslinking Step]

The resultant polymer nanofiber sheet was sandwiched between mesh plates. After that, the resultant was subjected to heating treatment using an oven at 40° C. for 4 hours in the coexistence of a beaker filled with a hydrochloric acid aqueous solution. Thus, a polymer nanofiber sheet in which the polymer nanofibers were crosslinked by the derivative of the epoxy compound (crosslinked part) was obtained.

Table 1 shows the results of the evaluations. It should be noted that the average fiber diameter of the polymer nanofibers constituting the polymer nanofiber sheet after the crosslinking step was 0.50 μm.

Example 3

[Preparation of Polymer Solution]

Polystyrene (PS, molecular weight: 280,000, manufactured by Sigma-Aldrich) as a polymer material and DMF were mixed to prepare 1 ml of a 30 wt % PS/DMF solution. Next, the PS/DMF solution was mixed with a bisphenol A-type epoxy compound ("AER-6017", manufactured by Asahi Kasei Epoxy Co., Ltd., Mn=2,700) as a low-molecular weight epoxy compound. At this time, the amount in which the low-molecular weight epoxy compound was mixed was adjusted so that the ratio of the low-molecular weight epoxy compound to the polystyrene became 10 wt %. Further, the latent catalyst used in Example 1 was mixed at the same ratio as that of Example 1.

[Sheet-Forming Step and Crosslinking Step]

A polymer nanofiber sheet in which polymer nanofibers were crosslinked by the derivative of the low-molecular weight epoxy compound (crosslinked part) was obtained in the same manner as in Example 1 except that conditions shown in Table 1 were adopted.

Table 1 shows the results of the evaluations. It should be noted that the average fiber diameter of the polymer nanofibers constituting the polymer nanofiber sheet after the crosslinking step was 0.75 μm.

Example 4

[Preparation of Polymer Solution]

Polyamide imide (PAI, "VYROMAX HR-13NX", manufactured by TOYOBO CO., LTD.) as a polymer material and DMF were mixed to prepare a PAI/DMF solution having a solid content concentration of 25 wt %. Next, the PAI/DMF solution was mixed with 4-hydroxybutyl acrylate glycidyl ether (Mw=200) as a low-molecular weight epoxy compound. At this time, the amount in which the low-molecular weight epoxy compound was mixed was adjusted so that the ratio of the low-molecular weight epoxy compound to the PAI became 11 wt %. Further, the latent catalyst used in Example 1 was mixed at the same ratio as that of Example 1.

[Sheet-Forming Step and Crosslinking Step]

A polymer nanofiber sheet in which polymer nanofibers were crosslinked by the derivative of the low-molecular weight epoxy compound (crosslinked part) was obtained in the same manner as in Example 1 except that conditions shown in Table 1 were adopted.

Table 1 shows the results of the evaluations. It should be noted that the average fiber diameter of the polymer nanofibers constituting the polymer nanofiber sheet after the crosslinking step was 0.70 μm.

Figure 3A:
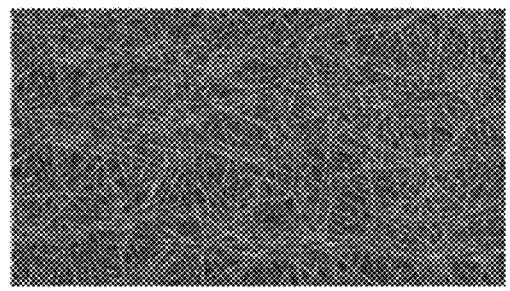
FIG. 3A and FIG. 3B are laser microscope photographs of a polymer nanofiber sheet of Example 4.
Figure 3B:
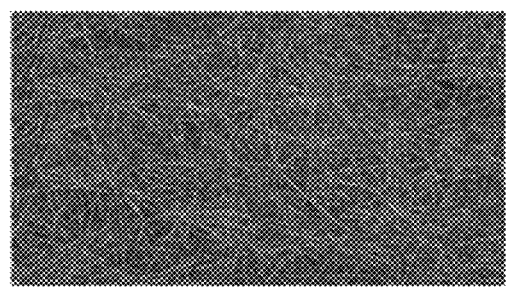

In addition, a simple friction test was performed. FIG. 3A and FIG. 3B are laser microscope photographs of the polymer nanofiber sheet. FIG. 3A is the photograph of the sheet before the simple friction test and FIG. 3B is the photograph of the sheet after the simple friction test. As shown in FIG. 3A and FIG. 3B, none of delamination and a wrinkle occurred even after the simple friction test, and hence it was able to be confirmed that the crosslinking of the polymer nanofibers was effectively performed.

Example 5

[Preparation of Polymer Solution]

A bisphenol A-type epoxy compound ("EPIKOTE 1007", manufactured by Japan Epoxy Resin Co., Ltd., Mn=2,600) as a low-molecular weight epoxy compound was mixed in the same PAI/DMF solution as that of Example 4. At this time, the ratio of the low-molecular weight epoxy compound to the PAI was adjusted to 7 wt %. Further, the latent catalyst used in Example 1 was mixed at the same ratio as that of Example 1.

[Sheet-Forming Step and Crosslinking Step]

A polymer nanofiber sheet in which polymer nanofibers were crosslinked by the derivative of the low-molecular weight epoxy compound (crosslinked part) was obtained in the same manner as in Example 1 except that conditions shown in Table 1 were adopted.

Table 1 shows the results of the evaluations. It should be noted that the average fiber diameter of the polymer nanofibers constituting the polymer nanofiber sheet after the crosslinking step was 0.50 μm.

Comparative Example 1

This comparative example is an example in which polymer nanofibers were joined by the fusion of the fibers without the use of any low-molecular weight epoxy compound.

[Preparation of Polymer Solution]

A thermoplastic polyester-based hot-melt material (PES, "ARON MELT PES360S30", manufactured by TOAGOSEI CO., LTD., solid content: 40 wt %, solvent (toluene:MEK=8:2)) as a polymer material and toluene were mixed. At this time, the addition amount of toluene was set so as to be 10 wt % with respect to the hot-melt material.

[Sheet-Forming Step and Crosslinking (Fusing) Step]

A polymer nanofiber sheet in which polymer nanofibers were fused together was obtained in the same manner as in Example 1 except that conditions shown in Table 1 were adopted.

Table 1 shows the results of the evaluations. It should be noted that the average fiber diameter of the polymer nanofibers before the crosslinking step (before the heating treatment) was 0.90 μm.

Comparative Example 2

[Preparation of Polymer Solution]

Polyvinylidene fluoride-hexafluoropropylene (PVDF-HFP, "KYNAR 2750", manufactured by KYNAR) as a polymer material, and a mixed solvent obtained by mixing dimethylacetamide (DMAc) and acetone at 1:2 were mixed to prepare a PVDF-HFP solution. At this time, the amount of the PVDF-HFP was adjusted so that the concentration of the PVDF-HFP in the solution became 10 wt %. Next, the PVDF-HFP solution was mixed with a bisphenol A-type epoxy compound ("EPOTOHTO YD-020", manufactured by Tohto Kasei Co., Ltd., Mn=5,200) as an epoxy compound having a number-average molecular weight in excess of 3,000. At this time, the ratio of the epoxy compound to the PVDF-HFP was adjusted to 10 wt %. Further, the latent catalyst used in Example 1 was mixed at the same ratio as that of Example 1.

[Sheet-Forming Step and Crosslinking Step]

A polymer nanofiber sheet was obtained in the same manner as in Example 1 except that conditions shown in Table 1 were adopted.

Table 1 shows the results of the evaluations. It should be noted that the average fiber diameter of the polymer nanofibers constituting the polymer nanofiber sheet after the crosslinking step was 0.40 μm.

TABLE 1

| | | | Sheet-forming step | | Crosslinking step | | | | |
|---|---|---|---|---|---|---|---|---|---|
| | Polymer | Epoxy compound | Voltage applied to spinning nozzle [kV] | Injection time [min] | Heating temperature [° C.] | Heating time [hr] | Delamination resistance | Mechanical strength [%] | Shape change |
| Example 1 | PCL | Poly(ethylene glycol) diglycidyl ether (Mn: 500) | 17 | 10 | 80 | 2 | B | 200 | II (6%) |
| Example 2 | PEO | Ethylene glycol diglycidyl ether (Mw: 174) | 19 | 10 | 40 | 4 | A | 450 | II (5%) |
| Example 3 | PS | Bisphenol A-type epoxy compound (Mn: 2,700) | 20 | 10 | 80 | 3 | A | 500 | II (5%) |
| Example 4 | PAI | 4-Hydroxybutyl acrylate glycidyl ether (Mn: 200) | 20 | 10 | 170 | 3 | A | 630 | I (2%) |
| Example 5 | PAI | Bisphenol A-type epoxy compound (Mn: 2,600) | 25 | 10 | 160 | 4 | A | 720 | I (2%) |
| Comparative Example 1 | PES | — | 25 | 10 | 150 | 0.5 | A | — | III (22%) |
| Comparative Example 2 | PVDT-HFP | Bisphenol A-type epoxy compound (Mn: 5,200) | 17 | 10 | 150 | 4 | C | — | I (4%) |

The facts that were able to be made clear or confirmed in Examples and Comparative Examples are described below.

Comparison between Examples (Examples 1 to 5) and Comparative Example 2 shows that when the polymer nanofibers were crosslinked by using the low-molecular weight epoxy compound, the following result was obtained in the evaluation for delamination resistance: no delamination occurred (the evaluation A) or the delamination was extremely slight (the evaluation B). Accordingly, it was able to be confirmed that the polymer nanofiber sheet of the present invention was significantly improved in delamination resistance between the polymer nanofibers constituting the sheet. It should be noted that the molecular weight (number-average molecular weight) of the epoxy compound of the polymer nanofiber sheet of Comparative Example 2 exceeded 3,000 and hence a good result was not obtained in the evaluation test for delamination resistance (the evaluation C). In view of the studies conducted on Comparative Example 2, it was made clear that the solution for spinning was clouded at the stage of the preparation of the solution. It was also made clear from the result of the IR measurement that the distribution difference of the peak of an epoxy occurred depending on places. It is assumed that in Comparative Example 2 the epoxy compound loaded into the solution for spinning could not be uniformly dispersed in each of the polymer nanofibers in Comparative Example 2.

In addition, the evaluation for a mechanical strength showed that a tensile strength was increased several times by the crosslinking with the low-molecular weight epoxy compound. It was able to be confirmed from the foregoing that the mechanical strength of the polymer nanofiber sheet of the present invention significantly increased. It should be noted that in Comparative Example 1, the strength of the sheet after the fusing (crosslinking) step increased as compared to that before the fusing (crosslinking) step, but as described later, such a structural change that a fiber diameter largely changed occurred, and hence Comparative Example 1 cannot be unconditionally compared to Examples only from the viewpoint of a strength increase ratio.

Accordingly, the mechanical strength of the polymer nanofiber sheet of the present invention was found to be high. As a result, the polymer nanofiber sheet of the present invention is advantageous for long-term use because the polymer nanofibers constituting the polymer nanofiber sheet do not easily fray off each other.

In addition, it was able to be confirmed from comparison between Examples (Examples 1 to 5) and Comparative Example 1 that the shapes of the polymer nanofibers were able to be substantially maintained after the crosslinking step as compared to those before the step by crosslinking the polymer nanofibers with the low-molecular weight epoxy compound. In contrast, it was able to be confirmed that in Comparative Example 1, the polymer nanofibers were fused together and hence the delamination resistance improved but a fiber diameter significantly changed after the fusing (crosslinking) step as compared to that before the step.

In addition, as can be seen from comparison between Example 1 and the other examples (Examples 2 to 5), in each example except Example 1, at least part of a non-crosslinking functional group in the low-molecular weight epoxy compound is the same as a functional group in the repeating unit of the polymer constituting the polymer nanofibers. It was able to be confirmed that in such case, the delamination resistance became better (the evaluation B→the evaluation A) and the mechanical strength increased. Here, examples of the functional group (common functional group) serving as at least part of the non-crosslinking functional group and included in the repeating unit of the polymer include those shown in Table 2.

TABLE 2

| | Common functional group |
|---|---|
| Example 2 | Ether group |
| Example 3 | Benzene ring |
| Example 4 | Carbonyl group |
| Example 5 | Benzene ring |

In addition, comparison between the results of the evaluation of the polymer nanofibers for shape changes in Examples 1 to 3, and Examples 4 and 5 showed the following. That is, it was found that in the polymer nanofiber sheet of Example 4 or 5 having an imide structure in the repeating unit of the polymer, no conspicuous change in shape of a polymer nanofiber was observed after the crosslinking step as compared to the shape before the step (the evaluation I). It was able to be confirmed from the result that when the polymer material forming the polymer nanofibers was a polymer having an imide structure in its repeating unit, the polymer nanofiber had a high mechanical strength in addition to heat resistance by virtue of the rigid and strong molecular structure of the imide structure. It was able to be confirmed from the results of Examples 4 and 5 that each of the polymer nanofiber sheets of Examples 4 and 5 was a polymer nanofiber sheet that hardly deformed after the crosslinking step as compared to the shape before the step and that had a high specific surface area.

As described in Examples, the polymer nanofiber sheet of the present invention was found to be such a polymer nanofiber sheet that delamination resistance between its polymer nanofibers was good, the mechanical strength of the polymer nanofiber sheet was high, and the specific surface area thereof was high.

The present invention has been described above in detail by way of Examples. However, Examples are for illustrative purposes only and the present invention is not limited to Examples. That is, needless to say, the present invention includes various changes and modifications of Examples given above.

The polymer nanofiber sheet of the present invention can be a polymer nanofiber sheet having a high specific surface area that can be used over a long time period even when an external factor such as rubbing is applied. Accordingly, the sheet can be suitably utilized as, for example, a triboelectric charging material in a static electricity generator or apparatus for sorting particles with an electric field. In addition, the form of use of the polymer nanofiber sheet of the present invention, which is not particularly limited, is, for example, a form in which the sheet is handled by being wound around a roller member.

As described above by way of the embodiments and Examples, according to the present invention, the polymer nanofiber sheet having high delamination resistance, a high mechanical strength, and a high specific surface area can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A method of producing a polymer nanofiber sheet, the polymer nanofiber sheet comprising polymer nanofibers, each of which comprises a polymer, the polymer nanofibers being laminated, three-dimensionally entangled with each other, and in contact with each other, the method comprising steps of:
    providing a polymer solution containing the polymer and a low molecular weight epoxy compound, wherein the polymer comprises at least one polymer selected from the group consisting of a polycaprolactone, a polyethylene oxide, and a polystyrene, and wherein the low-molecular weight epoxy compound is 4-hydroxybutyl acrylate glycidyl ether;
    electro-spinning the polymer solution to form a sheet comprising the polymer nanofibers, wherein the polymer nanofibers have an average diameter of 50 nm to less than 1000 nm, and wherein each of the polymer nanofibers has the low-molecular weight epoxy compound on its surface; and
    crosslinking the polymer nanofibers with each other by a chemical reaction between a glycidyl group and a hydroxyl group of the low-molecular weight epoxy compound on the surface of the polymer nanofibers and the polymer in the polymer nanofibers at a position where the polymer nanofibers are in contact with each other.

2. The method according to claim 1, wherein the polymer solution further contains a latent catalyst.

3. The method according to claim 2, wherein the latent catalyst comprises a thermal cationic polymerization initiator.

4. A method of producing a polymer nanofiber sheet, the polymer nanofiber sheet comprising polymer nanofibers, each of which comprises a polymer, the polymer nanofibers being laminated, three-dimensionally entangled with each other, and in contact with each other, the method comprising steps of:
    providing a polymer solution containing the polymer and a low-molecular weight epoxy compound, wherein the polymer comprises a polyamide imide, and wherein the low-molecular weight epoxy compound is 4-hydroxybutyl acrylate glycidyl ether;
    electro-spinning the polymer solution to form a sheet comprising the polymer nanofibers, wherein the polymer nanofibers have an average diameter of 50 nm to less than 1000 nm, and wherein each of the polymer nanofibers has the low-molecular weight epoxy compound on its surface; and
    crosslinking the polymer nanofibers with each other by a chemical reaction between a glycidyl group and a hydroxyl group of the low-molecular weight epoxy compound on the surface of the polymer nanofibers and the polymer in the polymer nanofibers at a position where the polymer nanofibers are in contact with each other.

* * * * *